(12) United States Patent  (10) Patent No.: US 7,693,782 B1
Stricker et al.  (45) Date of Patent: Apr. 6, 2010

(54) METHOD AND SYSTEM FOR EVALUATING A LOAN

(75) Inventors: Alex Stricker, Bethesda, MD (US); Eric L. Rosenblatt, Derwood, MD (US)

(73) Assignee: Fannie Mae, Washington, DC (US)

( * ) Notice: Subject to any disclaimer, the term of this patent is extended or adjusted under 35 U.S.C. 154(b) by 916 days.

(21) Appl. No.: 11/195,356

(22) Filed: Aug. 2, 2005

Related U.S. Application Data

(60) Provisional application No. 60/598,520, filed on Aug. 3, 2004.

(51) Int. Cl.
*G06Q 40/00* (2006.01)
(52) U.S. Cl. .......................................... 705/38; 705/35
(58) Field of Classification Search .................... 705/35, 705/38
See application file for complete search history.

(56) References Cited

U.S. PATENT DOCUMENTS

| | | | | |
|---|---|---|---|---|
| 5,966,700 | A * | 10/1999 | Gould et al. | 705/38 |
| 6,233,566 | B1 | 5/2001 | Levine et al. | |
| 6,988,082 | B1 | 1/2006 | Williams et al. | |
| 7,310,618 | B2 * | 12/2007 | Libman | 705/38 |
| 2001/0029482 | A1 | 10/2001 | Tealdi et al. | |
| 2002/0103750 | A1 * | 8/2002 | Herzfeld | 705/38 |
| 2003/0018558 | A1 | 1/2003 | Heffner et al. | |
| 2003/0093366 | A1 | 5/2003 | Halper et al. | |
| 2003/0144949 | A1 | 7/2003 | Blanch | |
| 2004/0153330 | A1 * | 8/2004 | Miller et al. | 705/1 |
| 2004/0225596 | A1 | 11/2004 | Kemper et al. | |
| 2005/0108064 | A1 * | 5/2005 | Castleman et al. | 705/4 |
| 2006/0074793 | A1 * | 4/2006 | Hibbert et al. | 705/38 |

* cited by examiner

*Primary Examiner*—Kambiz Abdi
*Assistant Examiner*—Jamie H Swartz
(74) *Attorney, Agent, or Firm*—Foley & Lardner LLP

(57) ABSTRACT

A system for evaluating risk associated with a mortgage loan includes an automated underwriting engine configured to calculate a first risk indication and a second risk indication for the mortgage loan. The first risk indication is based on mortgage loan application data received for the mortgage loan, and further based on at least one of interest rate risk and collateral risk associated with the mortgage loan. The second risk indication represents a probability of an adverse event associated with the mortgage loan. The probability of the adverse event is determined based on the mortgage loan application data. The system also includes user interface logic configure to provide a user interface, and further configured to provide the first risk indication to a lender in the form of an underwriting recommendation for the mortgage loan, and to provide the second risk indication to the lender in a form which is useable by the lender to manage the risk associated with the mortgage loan.

5 Claims, 9 Drawing Sheets

PRICE TABLE FOR LOANS WITH LOAN TERM ___ AND LOAN PURPOSE ___

| ACI RANGE | O1 (0,60] | O2 (60,70] | O3 (70,75] | O4 (75,80] | O5 (80,85] | O6 (85,90] | O7 (90,95] |
|---|---|---|---|---|---|---|---|
| A1 (LOW,520] | P(A1,O1) | P(A1,O2) | | | | | |
| A2 [520,540) | P(A2,O1) | P(A2,O2) | P(A2,O3) | | | | |
| A3 [540,560) | P(A3,O1) | P(A3,O2) | P(A3,O3) | | | | |
| A4 [560,580) | P(A4,O1) | P(A4,O2) | P(A4,O3) | P(A4,O4) | P(A4,O5) | P(A4,O6) | |
| A5 [580,600) | P(A5,O1) | P(A5,O2) | P(A5,O3) | P(A5,O4) | P(A5,O5) | P(A5,O6) | P(A5,O7) |
| A6 [600,620) | P(A6,O1) | P(A6,O2) | P(A6,O3) | P(A6,O4) | P(A6,O5) | P(A6,O6) | P(A6,O7) |
| A7 [620,640) | P(A7,O1) | P(A7,O2) | P(A7,O3) | P(A7,O4) | P(A7,O5) | P(A7,O6) | P(A7,O7) |
| A8 [640,660) | P(A8,O1) | P(A8,O2) | P(A8,O3) | P(A8,O4) | P(A8,O5) | P(A8,O6) | P(A8,O7) |
| A9 [660,680) | P(A9,O1) | P(A9,O2) | P(A9,O3) | P(A9,O4) | P(A9,O5) | P(A9,O6) | P(A9,O7) |
| A10 [680,700) | P(A10,O1) | P(A10,O2) | P(A10,O3) | P(A10,O4) | P(A10,O5) | P(A10,O6) | P(A10,O7) |
| A11 [700,720) | P(A11,O1) | P(A11,O2) | P(A11,O3) | P(A11,O4) | P(A11,O5) | P(A11,O6) | P(A11,O7) |
| A12 [720,740) | P(A12,O1) | P(A12,O2) | P(A12,O3) | P(A12,O4) | P(A12,O5) | P(A12,O6) | P(A12,O7) |
| A13 [740,HIGH) | P(A13,O1) | P(A13,O2) | P(A13,O3) | P(A13,O4) | P(A13,O5) | P(A13,O6) | P(A13,O7) |

OLTV RANGE

PRICE TABLE FOR LOANS WITH LOAN TERM ____ AND LOAN PURPOSE ____

| ACI RANGE | O1 (0,60] | O2 (60,70] | O3 (70,75] | O4 (75,80] | O5 (80,85] | O6 (85,90] | O7 (90,95] |
|---|---|---|---|---|---|---|---|
| A1 [LOW,520] | P(A1,O1) | P(A1,O2) | | | | | |
| A2 [520,540) | P(A2,O1) | P(A2,O2) | P(A2,O3) | | | | |
| A3 [540,560) | P(A3,O1) | P(A3,O2) | P(A3,O3) | | | | |
| A4 [560,580) | P(A4,O1) | P(A4,O2) | P(A4,O3) | P(A4,O4) | P(A4,O5) | P(A4,O6) | |
| A5 [580,600) | P(A5,O1) | P(A5,O2) | P(A5,O3) | P(A5,O4) | P(A5,O5) | P(A5,O6) | P(A5,O7) |
| A6 [600,620) | P(A6,O1) | P(A6,O2) | P(A6,O3) | P(A6,O4) | P(A6,O5) | P(A6,O6) | P(A6,O7) |
| A7 [620,640) | P(A7,O1) | P(A7,O2) | P(A7,O3) | P(A7,O4) | P(A7,O5) | P(A7,O6) | P(A7,O7) |
| A8 [640,660) | P(A8,O1) | P(A8,O2) | P(A8,O3) | P(A8,O4) | P(A8,O5) | P(A8,O6) | P(A8,O7) |
| A9 [660,680) | P(A9,O1) | P(A9,O2) | P(A9,O3) | P(A9,O4) | P(A9,O5) | P(A9,O6) | P(A9,O7) |
| A10 [680,700) | P(A10,O1) | P(A10,O2) | P(A10,O3) | P(A10,O4) | P(A10,O5) | P(A10,O6) | P(A10,O7) |
| A11 [700,720) | P(A11,O1) | P(A11,O2) | P(A11,O3) | P(A11,O4) | P(A11,O5) | P(A11,O6) | P(A11,O7) |
| A12 [720,740) | P(A12,O1) | P(A12,O2) | P(A12,O3) | P(A12,O4) | P(A12,O5) | P(A12,O6) | P(A12,O7) |
| A13 [740,HIGH) | P(A13,O1) | P(A13,O2) | P(A13,O3) | P(A13,O4) | P(A13,O5) | P(A13,O6) | P(A13,O7) |

FIG. 7

METHOD AND SYSTEM FOR EVALUATING A LOAN

CROSS-REFERENCE TO RELATED APPLICATIONS

This application claims the benefit of U.S. Provisional Application No. 60/598,520, filed Aug. 3, 2004 and entitled "Method and System for Evaluating a Loan," the entire content of which is hereby incorporated by reference.

FIELD

The present invention relates generally to methods and systems for processing data pertaining to financial assets, such as loans, securities, and so forth, and more particularly to methods and systems for evaluating risk characteristics of a loan.

BACKGROUND

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Therefore, potential homebuyers consult lenders such as banks, credit unions, mortgage companies, savings and loan institutions, state and local housing finance agencies, and so on, to obtain the funds necessary to purchase or refinance their homes. These lenders offer mortgage products to potential home buyers. The lenders who make (originate and fund) mortgage loans directly to home buyers comprise the "primary mortgage market."

When a mortgage is made in the primary mortgage market, the lender can: (i) hold the loan as an investment in its portfolio, or (ii) sell the loan to investors in the "secondary mortgage market" (e.g., pension funds, insurance companies, securities dealers, financial institutions and various other investors) to replenish its supply of funds. The loan may be sold alone, or in packages of other similar loans, for cash or in exchange for mortgage backed securities (MBS) which provide lenders with a liquid asset to hold or sell to the secondary market. By choosing to sell its mortgage loans to the secondary mortgage market for cash, or by selling the mortgage backed securities, lenders get a new supply of funds to make more home mortgage loans, thereby assuring home buyers a continual supply of mortgage credit.

The ability to assess the credit risk associated with a mortgage loan is important to both lenders and investors in the secondary market. A defaulted loan or a delinquent loan is costly to the owner of the asset (initially the lender in the primary mortgage market). Thus, the lender tries to avoid making loans in situations where there is a significant likelihood that the loan will later default or be delinquent. As a lender improves its ability to determine credit risk associated with a loan, the costs associated with lending go down. Fewer loans are given that default or become delinquent. In the secondary mortgage market, where mortgage loans are commonly sold to investors, fewer defaulted/delinquent loans results in a better return on investment, resulting in increased capital flow to the housing market. Better risk predictions, therefore, decrease the defaults/delinquencies, improve capital flow to the housing market, and ultimately decrease mortgage costs for consumers.

Mortgage loans originated by a lender (or alternatively a broker) are typically underwritten prior to closing. Although the final underwriting decision is made by the lender, the lender may submit a loan to an automated underwriting engine of the investor to determine whether the loan meets the credit risk eligibility and loan product eligibility requirements of the investor based on a set of loan information provided by the lender. Such loan information typically includes borrower-specific risk factors, loan-specific risk factors, and property-specific risk factors. Borrower-specific risk factors may include factors such as the borrower's credit rating or score, as well as other factors such as a borrower's income and financial reserves. Property-specific risk factors may include factors such as the type of property (e.g., manufactured housing, etc.). Loan-specific risk factors may include factors such as the loan-to-value ratio, the loan amount, the loan purpose, and so on.

In order to determine whether the loan is eligible for purchase by the investor, underwriting engines typically assess the probability that a borrower will default and the estimated financial loss to the purchaser as the result of the default. For example, in order to determine the probability of default, the underwriting engine may assign different weights to various risk factors or loan characteristics contained in the loan information provided by the lender that are indicative of the potential for default, and then derive the probability of default from the weighted factors. The different weights may be periodically adjusted in order to reflect changes, such as increases or decreases to the impact of particular risk factors or loan characteristics on the probability of default.

While the risk characteristics associated with a loan may often be evaluated in terms of the general risk of default for the loan, the overall risk characteristics associated with the loan may also include other types of risk as indicated by borrower-specific risk factors, loan-specific risk factors, and property-specific risk factors. Such risks and factors may often be specific to the particular investor providing the automated underwriting engine. A need exists for methods and systems for evaluating a loan which evaluate risk characteristics of loans with improved accuracy and which account for risks and costs associated with a loan for a particular investor.

Additionally, other parties, such as mortgage insurers and loan servicers, may wish to utilize the automated underwriting engine provided by an investor to evaluate the risk characteristics associated with a loan with improved accuracy at the time of origination of the loan, but without taking into account the risks and costs specific to the investor. A further need exists for methods and systems for evaluating a loan with improved accuracy at the time of origination.

SUMMARY

According to an exemplary embodiment, a system for evaluating risk associated with a mortgage loan includes an automated underwriting engine configured to calculate a first risk indication and a second risk indication for the mortgage loan. The first risk indication is based on mortgage loan application data received for the mortgage loan, and further based on at least one of interest rate risk and collateral risk associated with the mortgage loan. The second risk indication represents a probability of an adverse event associated with the mortgage loan. The probability of the adverse event is determined based on the mortgage loan application data. The system also includes user interface logic configure to provide a user interface, and further configured to provide the first risk indication to a lender in the form of an underwriting recommendation for the mortgage loan, and to provide the second risk indication to the lender in a form which is useable by the lender to manage the risk associated with the mortgage.

According to another exemplary embodiment, a method of providing an evaluation of risk associated with a mortgage loan includes receiving mortgage loan application data for a mortgage loan in a computerized loan underwriting system, and calculating a first risk indication for the mortgage loan. The first risk indication is based on mortgage loan application data received for the mortgage loan, and further based on at least one of interest rate risk and collateral risk associated with the mortgage loan. The method also includes calculating a second risk indication for the loan. The second risk indication represents a probability of an adverse event associated with the mortgage loan. The probability of the adverse event is determined using the mortgage loan application data. The method also includes providing the first risk indication to a lender in the form of an underwriting recommendation for the mortgage loan, and providing the second risk indication to the lender in a form which is useable by the lender to manage the risk associated with the mortgage loan.

According to another exemplary embodiment, a method of evaluating risk associated with a mortgage loan includes providing mortgage loan application data for a mortgage loan to a computerized loan underwriting system. The computerized loan underwriting system is configured to determine a probability of an adverse event associated with the mortgage loan based on the mortgage loan application data. The method also includes receiving a first risk indication and a second risk indication for the mortgage loan, the first risk indication and the second risk indication being received from the computerized loan underwriting system. The first risk indication is based on the mortgage loan application data, and further based on at least one of interest rate risk and collateral risk associated with the mortgage loan. The first risk indication represents an underwriting recommendation from an entity associated with the computerized loan underwriting system. The second risk indication represents a probability of an adverse event associated with the mortgage loan. The probability of the adverse event is determined using the mortgage loan application data. The method also includes managing the risk associated with the mortgage loan based on the second risk indication.

According to another exemplary embodiment, a method of evaluating insurance risk associated with a mortgage loan includes receiving mortgage loan application data regarding the mortgage loan in a computerized loan underwriting system during origination of the mortgage loan, generating an automated underwriting recommendation for the mortgage loan at the computerized loan underwriting system based on the mortgage loan application data, and calculating a delinquency risk grade for the mortgage loan based on the mortgage loan application data. The delinquency risk grade represents the probability of an adverse event associated with the mortgage loan and comprises one of a plurality of delinquency risk levels. The method also includes providing the delinquency risk grade to the mortgage insurer to facilitate management of the risk associated with the mortgage loan by the mortgage insurer.

According to another exemplary embodiment, a method of evaluating insurance risk associated with a mortgage loan includes receiving an automated underwriting recommendation for the mortgage loan from a computerized loan underwriting system, and receiving a delinquency risk grade for the mortgage loan from the computerized system. The delinquency risk grade reflects a probability of an adverse event associated with the mortgage loan and is determined by the computerized system based on mortgage loan application data for the mortgage loan. The delinquency risk grade comprises one of a plurality of delinquency risk levels. The method also includes determining at least one of an amount of mortgage insurance and a cost of mortgage insurance for the mortgage loan based on the delinquency risk grade, and providing the at least one of an amount of mortgage insurance and a cost of mortgage insurance for the mortgage to an entity associated with the computerized system.

According to another exemplary embodiment, a method of evaluating risk associated with servicing a mortgage loan includes receiving mortgage loan application data regarding the mortgage loan in a computerized loan underwriting system during origination of the mortgage loan, generating an automated underwriting recommendation for the mortgage loan in the computerized loan underwriting system based on the mortgage loan application data, and calculating a delinquency risk grade for the mortgage loan based on the mortgage loan application data. The delinquency risk grade represents the probability of an adverse event associated with the mortgage loan. The delinquency risk grade comprises one of a plurality of delinquency risk levels. The method also includes providing a report to a loan servicer to facilitate management of the risk associated with servicing the mortgage loan. The report comprises the underwriting recommendation and the delinquency risk grade.

According to another exemplary embodiment, a method of evaluating risk associated with servicing a mortgage loan includes receiving a report from a computerized system comprising an underwriting recommendation and a delinquency risk grade for the mortgage loan. The delinquency risk grade is based on the probability of an adverse event associated with the mortgage loan and determined by an entity associated with the computerized system based on mortgage loan application data for the mortgage loan. The delinquency risk grade comprises one of a plurality of delinquency risk levels. The method also includes managing the risk associated with servicing the mortgage loan based on the report. Managing the risk includes at least one of adjusting an amount of servicing maintenance for a borrower associated with the mortgage loan, and adjusting an investment portfolio.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 5 illustrates a predetermined table of values representative of prices for a loan according to an exemplary embodiment;

FIG. 7 illustrates corresponding levels of recommendation for a predetermined table values representative of prices for a loan according to an exemplary embodiment;

DETAILED DESCRIPTION

Figure 1:
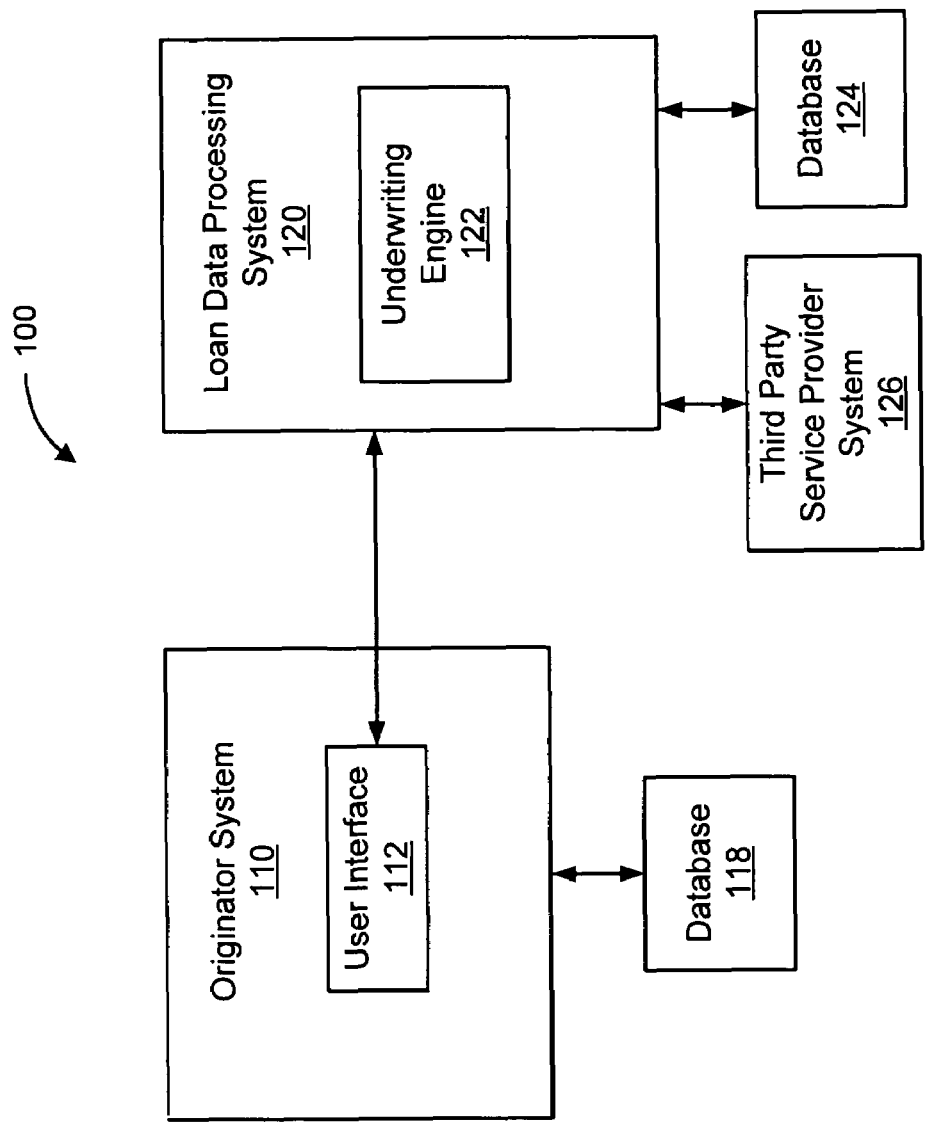
FIG. 1 is a block diagram illustrating a system for underwriting loans according to an exemplary embodiment.

Before turning to the FIGURES which illustrate the exemplary embodiments in detail, it should be understood that, while the method and system for evaluating a loan are mainly described in the context of mortgage loans, the method and system are equally applicable to other types of loans or financial products. The term "underwriting" as used herein refers generally to the process of evaluating a loan application to determine the risk involved for a lender.

Turning now to the FIGURES which illustrate the exemplary embodiments in detail, a method and system for evaluating a loan are disclosed. According to an exemplary embodiment, a first risk indication is determined for the loan during origination of the loan. The first risk indication may be a value representative of the amount of overall risk associated with the loan, such as the overall economic risk for a secondary mortgage market participant. The term "economic risk" as used herein refers generally to risk posed to an entity, such as a secondary market purchaser, due to adversely changing regional, nationwide, or global financial circumstances. The first risk indication is based on factors such as a probability of delinquency, as well as one or more economic risk factors. Economic risk may by measured based on such factors as possible variations in the entity's earnings, variations in nationwide average home prices (or prices associated with other forms of collateral), home sales, and/or interest rates, variations in rates of prepayment or default for loans held by the entity, projected financial losses, costs associated with capital reserve requirements for the entity, etc.

The first risk indication may be provided in the form of a loan evaluation to evaluate the risk characteristics of the loan, in the form of a risk-based price (e.g., a guaranty fee or other value) and/or in other forms. The loan evaluation may be an actual underwriting decision or, preferably, an underwriting recommendation. For example, in embodiments where the loan evaluation is provided by a lender, such as a loan officer or mortgage broker, the loan evaluation may be an underwriting decision. In embodiments where the loan evaluation is provided by a secondary mortgage market participant, the loan evaluation is merely an underwriting recommendation since the final underwriting decision is made by the lender. In the same vein, when a favorable loan evaluation is returned, the favorable loan evaluation may be in the form of an approval decision (i.e., made by a lender) or an approval recommendation (i.e., made be a secondary mortgage market participant).

By evaluating the loan during origination based on factors such as economic risk factors for a secondary mortgage market participant, the method and system for evaluating a loan may more accurately compensate for an increase in the associated risk and cost for various types of loans to the secondary mortgage market participant. As a result, the secondary mortgage market participant may be able to make more informed loan purchases and may be able to expand to other types of loan products. Additionally, by providing the loan evaluation based on factors such as economic risk factors, the method and system for evaluating a loan provides loan evaluations that are more consistent with many pricing methodologies used after origination for loans that are acquired through other means. As a result, a better understanding of relative risks and costs may be achieved.

The method and system for evaluating a loan may also determine a second risk indication during origination of the loan. The second risk indication may be purely an indication of the risk of an adverse event associated with the loan, such as the risk of default, a probability of a financial loss as the result of default, or the risk of delinquency, rather than a value representative of the amount of overall economic risk and cost for a secondary mortgage market participant. The second risk indication may be used by, for example, a loan originator, a mortgage insurer, or a loan servicer so that loan portfolio decisions, mortgage insurance decisions, and/or other risk management decisions may be made independent of the overall risk and cost of the loan to the secondary market purchaser. The secondary mortgage market participant may also use the second indication of the risk of an adverse event associated with the loan to determine eligibility for new types of loan products.

The method of and system for evaluating a loan may generally be implemented as part of a system 100 shown in FIG. 1. FIG. 1 illustrates a system 100 for originating and underwriting loans, such as mortgage loans, according to an exemplary embodiment. As shown in FIG. 1, system 100 includes an originator system 110 and a loan data processing system 120. System 100 is generally configured to allow loan originators (e.g., lenders or third party originators such as brokers) to provide evaluations for loan applications as well as other services associated with underwriting and originating loans (e.g., obtaining a credit report, title, MI, registering a loan, rate locking a loan, obtaining a price for a loan, etc.). More particularly, system 100 is configured to provide a first risk indication and a second risk indication from a purchaser in the secondary mortgage market.

In the illustrated embodiment, originator system 110 is associated with and configured to be used by a third party originator such as a lender or broker. Loan data processing system 120 is associated with and configured to be used by a participant in a secondary market, such as the secondary mortgage market. Herein, for convenience, the secondary market participant is referred to as a "purchaser," although it should be understood that the purchaser may participate in the secondary market in other, different, or additional ways (e.g., as a loan guarantor, as a loan securitizer, and so on).

Originator system 110 includes a user interface 112, and is coupled to a database 118. User interface 112 may be used to access loan data processing system 120 in order to request and receive an underwriting recommendation for a loan. Preferably, a user accesses loan data processing system 120 through a data connection, such as the Internet or an Intranet, by using a personal/laptop computer or other suitable network-enabled device. For example, loan data processing system 120 may be accessible to users by utilizing user interface 112 to access a web site or portal (e.g., a web site of the entity that owns/operates loan data processing system 120 such as a purchaser, lender, etc.) and clicking on appropriate links located at the web site or portal.

Loan data processing system 120 includes an underwriting engine 122 and is coupled to a database 124 configured to store data received by loan data processing system 120. Loan data processing system 120 may also be coupled to third party service provider system 126 to obtain, for example, a requested credit report, title, MI, etc. Loan data processing system 120 is preferably configured to support various transactions which may be executed by a purchaser in connection with one or more loans. For example, in the illustrated embodiment, underwriting engine 122 is in data communication with originator system 110 via a data connection. Underwriting engine 122 receives loan data from originator system 110 and returns an underwriting recommendation and any other requested information to originator system 110 via user interface 112. According to an exemplary embodiment, underwriting engine 122 is configured to receive loan data forwarded by loan services engine 130, and to provide an underwriting recommendation for the loan.

Figure 2:
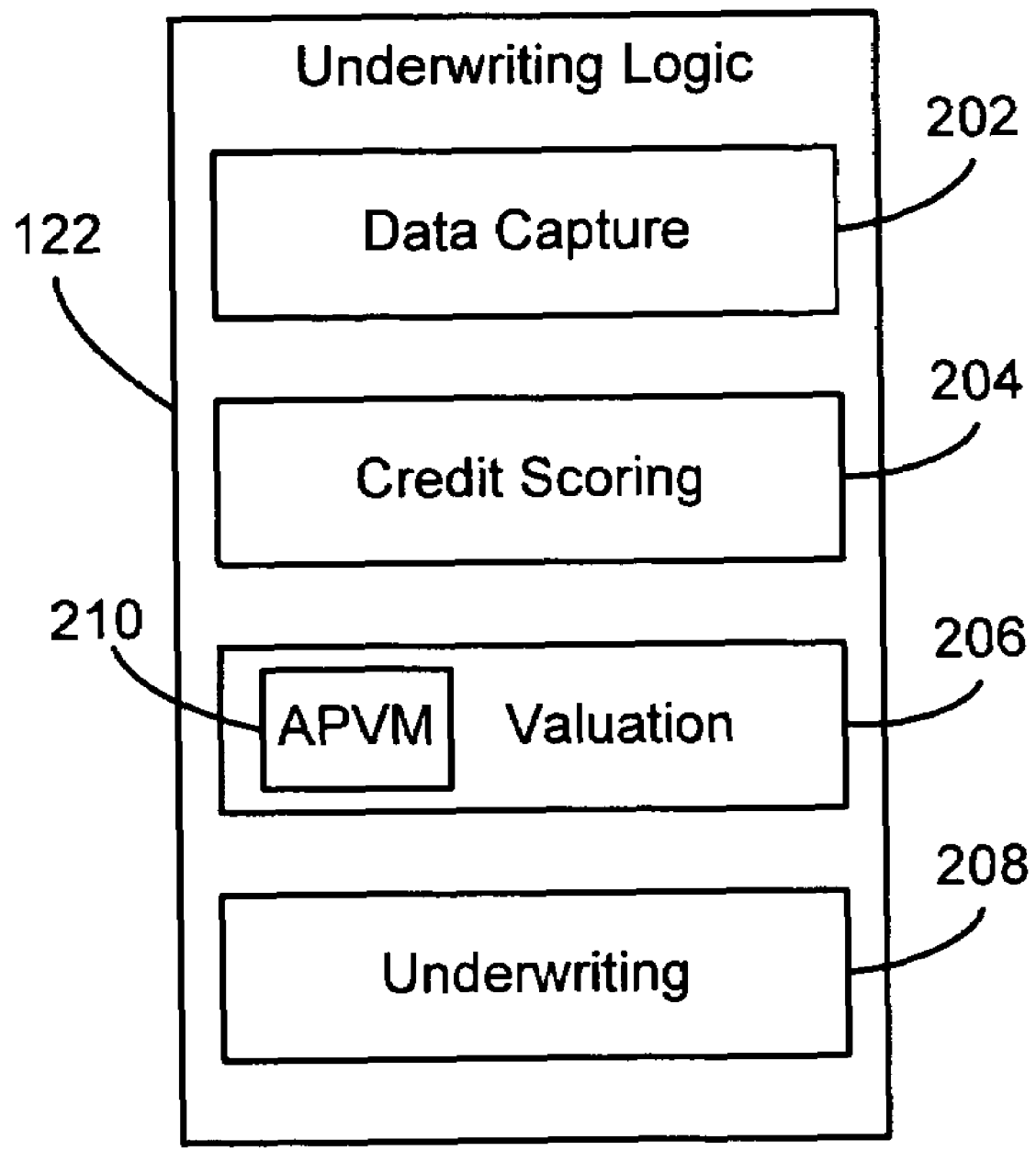
FIG. 2 is a block diagram illustrating an exemplary underwriting engine in greater detail.

FIG. 2 illustrates an exemplary underwriting engine 122 in greater detail. Underwriting engine 122 includes data capture logic 202, credit scoring logic 204, valuation logic 206, and underwriting logic 208. Data capture logic 202 is used to receive loan data or information to be used in loan underwriting and appraisal (e.g., information from a loan application and/or a credit report), such as loan data from loan originator system 110. Typically, the loan data or information that is received for loan underwriting includes information that would be provided on a loan application by a borrower or loan applicant, and supplemental data provided by a lender, such as borrower-specific information, loan-specific information, and property-specific information. For example, the loan data or information may include data such as a credit report, loan product information, loan term, loan-to-value ratio, an appraisal value (e.g., submitted by a borrower or loan applicant), income, borrower contribution, loan purpose, loan type, property type, occupancy status, broker information, etc.

Credit scoring logic 204 generates a credit rating, such as a credit score for a borrower or loan applicant based on the borrower or loan applicant's credit history, which may be obtained from information from a loan application and/or a credit report received by data capture logic 202. According to an exemplary embodiment, the credit score is based on merged credit report data received from multiple credit bureaus, as well as various borrower-specific risk factors, loan-specific risk factors, and property-specific risk factors included in the data or information received by data capture logic 202. The credit score also corresponds to a probability of delinquency. For example, according to an exemplary embodiment, the credit score corresponds to the probability of a borrower delinquency of 90 days or greater within the first twelve scheduled monthly loan payments.

Valuation logic 206 analyzes an appraisal value associated with a loan, such as an appraisal value submitted by a borrower or loan applicant for a property associated with a mortgage loan received by data capture logic 202, and estimates the accuracy of the submitted appraisal value based on loan data received by data capture logic 202, such as data related to a foreclosure sale for a property associated with the loan application, data indicating that the loan application is associated with a purchase money transaction, or other data from data capture logic 202. Valuation logic 206 also estimates the accuracy of the submitted appraisal value based on an alternative appraisal value, such as an appraisal value determined independent of the submitted appraisal value by, for example, an automated property valuation model (APVM) 210.

Underwriting logic 208 is configured to use data or information from data capture logic 202, credit scoring logic 204, and valuation logic 206 to determine if the loan meets credit risk and eligibility requirements of a purchaser or of a lender for the purposes of its portfolio, and to provide an underwriting recommendation based on the assessment of the overall risk profile of the loan. For example, underwriting logic 208 may combine the credit score from credit scoring logic and the estimated accuracy from valuation logic 206 with other information (e.g., debt-to-income ratios, income verification, borrower contribution, cash reserves of the borrower, the existence and amount of subordinate financing, and other factors) to provide an underwriting recommendation regarding whether the loan as recommended for purchase by a purchaser in the secondary market. Underwriting logic 208 may also be used to generate reports that provide information regarding the underwriting recommendation for a particular loan, information used in determining the recommendation (e.g., property, loan, and borrower information), and information summarizing key statistics from the credit report (e.g., borrower's open accounts, derogatory accounts, and undisclosed accounts).

Figure 3:
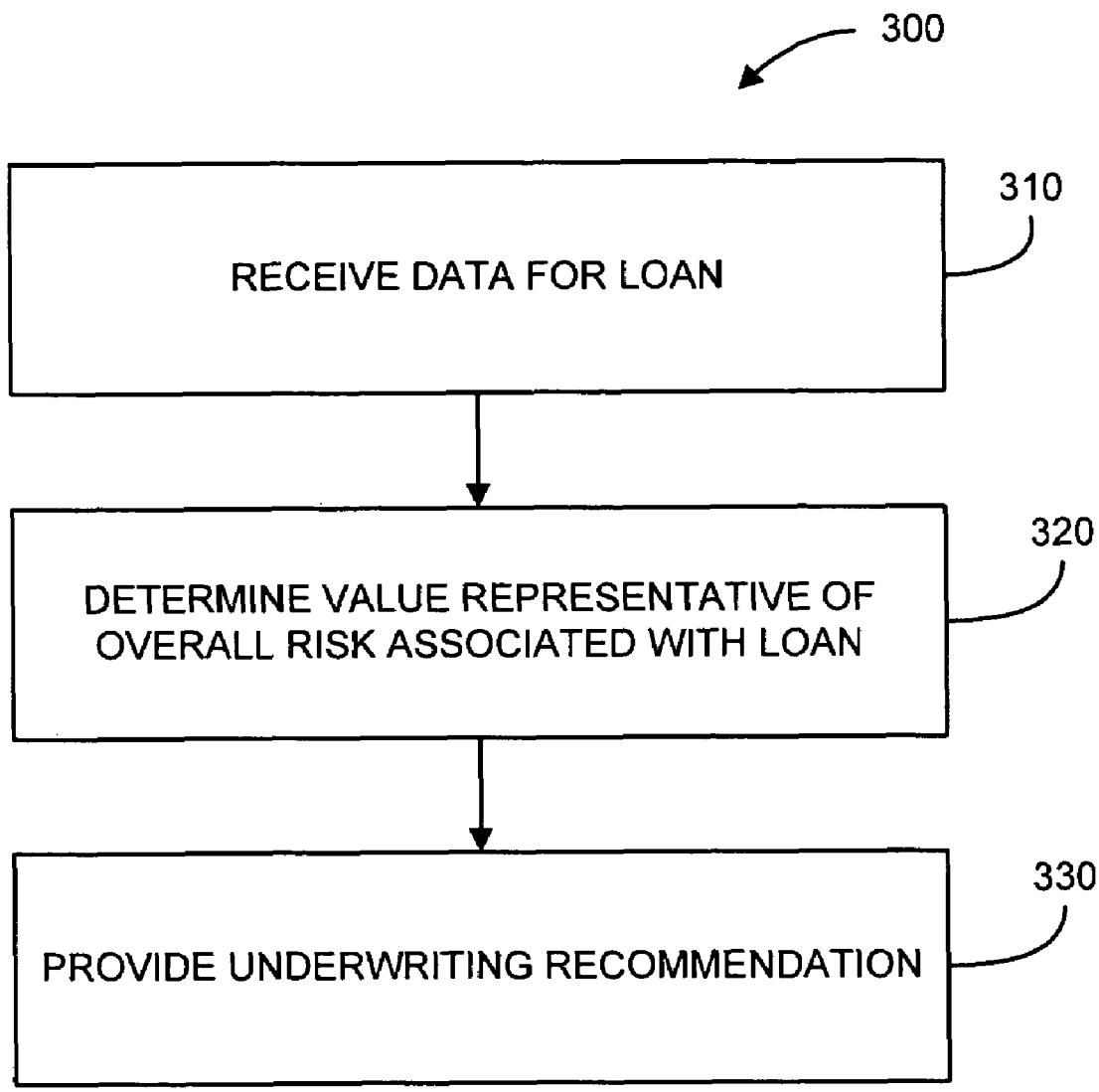
FIG. 3 is a flow diagram illustrating a method of evaluating a loan using a first risk indication according to an exemplary embodiment.

FIG. 3 illustrates a method 300 of evaluating a loan using a first risk indication according to an exemplary embodiment. Method 300 may be implemented using, for example, system 100 shown in FIG. 1. Method 300 begins with a step 310. At step 310, data is received for the loan, such as a mortgage loan associated with, for example, manufactured housing. The term "manufactured housing" as used herein refers generally to homes or dwellings that are not built at the home site, but rather are moved to the location. Data for the loan includes those types of borrower-specific information, loan-specific information, and property-specific information and other information supplied by a borrower or lender as described above with reference to FIG. 2.

In a step 320, a first risk indication is determined for the loan using the data received in step 310, wherein the first risk indication is value representative of the overall risk associated with the loan. According to an exemplary embodiment, the value is a value representative of a price for the loan based on the cost of risks associated with the loan transaction. The term "price" as used herein refers to an amount paid for an interest in a loan, such as a mortgage loan. For example, when referring to the buying and selling of bonds and mortgages, price represents the percentage relationship between the amount paid for an instrument and the face value of that instrument. If sold for par, the price is 100 percent of face value; a premium price could be, for example, 105 percent of face value; and a discount price could be, for example, 95 percent of face value. Another example of a price is a guaranty fee. The term "guaranty fee" as used herein generally refers to a fee charged in return for a guaranty of timely payment of interest and principal to the purchaser of a security backed by a particular group of loans. The value representative of the overall risk associated with the loan is based on a probability of delinquency for the loan and takes into account various risk factors economic risk factors, such as projected house prices and interest rates. Preferably, the methodology used to determine the value representative of the overall risk associated with the loan during the underwriting process is consistent with methodologies used for similar loans that are acquired as part of a bulk transfer of an existing portfolio of loans made outside of the origination process.

Figure 4:
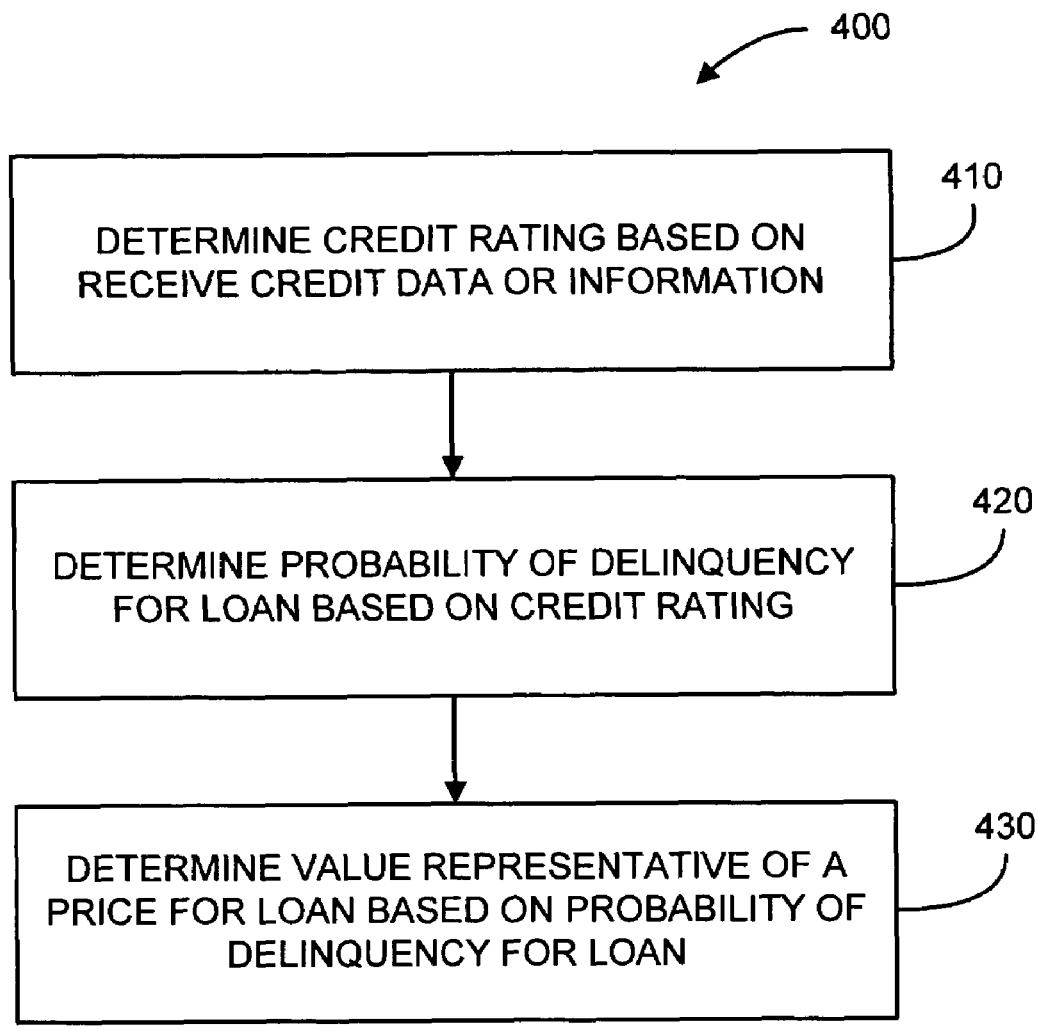
FIG. 4 is a flow diagram illustrating a method of determining a value representative of a risk-based price for a loan according to an exemplary embodiment.

FIG. 4 illustrates an exemplary method 400 for determining a value representative of a price for a loan, such as a model guaranty fee for a mortgage loan for manufactured housing. The method begins with a step 410. In step 410, a credit rating, such as a credit score, is determined for the borrower or loan applicant based on the borrower or loan applicant's credit history, which may be obtained from information from a loan application and/or a credit report received in step 310.

An example of a credit score is the Fair Isaac (FICO) credit score. According to an exemplary embodiment, the credit score is determined based on combined credit report data received from multiple credit bureaus (e.g., Equifax, Experion, Trans Union), and utilizes several different credit-related parameters contained in each credit report. Exemplary parameters may include data related to the borrower's past frequency of delinquency, the age of any past delinquencies, the borrower's usage of available credit sources, the age and amount of credit sources available to the borrower, the number and age of any recently acquired credit sources, and public records and collection data for the borrower. The credit score also corresponds to a probability of delinquency. Generally, the credit score is considered an early predictor of delinquency because it is derived from the several different credit-related parameters listed above. According to an exemplary embodiment, the credit score corresponds to the probability of a borrower delinquency of 90 days or greater within the first twelve scheduled monthly loan payments.

In a step 420, a probability of delinquency for the loan is determined based on, for example, the credit rating determined in step 410, as well as various borrower-specific risk factors, loan-specific risk factors, and property-specific risk factors included in the data or information received in step 310. According to an exemplary embodiment, the probability of delinquency is an acquisition credit index (ACI). An exemplary system and method for determining an ACI in connection with a loan is described in greater detail in co-pending U.S. application Ser. No. 10/816,496, filed Apr. 1, 2004 and entitled "Method and System for Assessing Loan Credit Risk and Performance," the entire contents of which are incorporated herein by reference. According to an exemplary embodiment, the probability of delinquency represented by the ACI is scaled to be a number between approximately 300 and 900 and represents the probability of a borrower delinquency of 90 days or greater within the first twelve scheduled monthly loan payments.

According to another exemplary embodiment, the probability of delinquency determined in step 420 is an ACI specifically applicable to mortgage loans associated with manufactured housing. A manufactured housing-specific ACI may be used in this embodiment because there may be a correlation between a borrower being more or less likely to become seriously delinquent or default if the mortgage loan is for manufactured housing. In this embodiment, the manufactured housing-specific ACI is the probability of a borrower delinquency of 90 days or greater within the first twelve scheduled monthly loan payments and is based on the credit rating or score determined in step 410, as well as data or information including the loan purpose, origination loan-to-value ratio (OLTV), loan term, borrower reserves, backend information, and information regarding whether the mortgage loan is for a principal residency or investment received in step 310.

The loan purpose provides an indication of the financing purpose behind the loan, such as a cash-out refinance or a rate term refinance. A cash-out refinance is a refinance transaction in which the amount of money received from the new loan exceeds the total of the money needed to repay the existing first mortgage, closing costs, points, and the amount required to satisfy any outstanding subordinate mortgage liens. A rate term refinance is a refinance transaction where the rate and term of the new loan are adjusted. The OLTV ratio is the percentage of the amount borrowed relative to the amount at which the purchased property is valued. High OLTV scores indicate a greater risk. For example, where the OLTV is greater than 80%, personal mortgage insurance (PMI) is generally required because of the increased risk of default or delinquency. Borrower reserve information relates to money held in reserve to make payment on the loan, and is useful in determining the probability of delinquency because the more money that a borrower has in reserve (e.g., in a savings or checking account), the less likely the loan will not be paid. Backend information relates to the ratio of debt to monthly income (the percentage of a borrower's monthly income that goes to pay monthly debts). Backend information can be helpful in a determination of risk for delinquency or default because it shows how much of a borrower's monthly income goes towards paying the loan. Where a higher percentage of the monthly income is used for the loan payment, the greater the chance is that the payment may be skipped.

According to various alternative embodiments, additional, fewer, or differing types of data, information, or variables may be used to determine the manufactured housing-specific ACI, and estimated or assumed values may be used for these variables to simplify determination of the ACI. For example, according to an exemplary embodiment, the manufactured housing-specific ACI assumes a specific credit premium and full loan documentation because this information may be missing from the loan application at the time the ACI is determined. Additionally, differing equations may be used to determine the manufactured housing-specific ACI, such as logit and probit models. Also, differing weights or value ranges may be associated with the differing types of data, information, or variables used to determine the manufactured housing-specific ACI.

In a step 430, the value representative of the price for the loan is determined based on the probability of delinquency for the loan determined in step 420, and may further be based on, for example, data or information regarding the OLTV ratio, loan purpose, and loan term received in step 310. According to an exemplary embodiment, the probability of delinquency for the loan determined in step 420, and the data or information regarding the OLTV ratio, loan purpose, and loan term received in step 310 are used to select the value from a predetermined table of values representative of prices.

FIG. 5 illustrates a predetermined table of values representative of prices 500 for a loan, such as a manufactured housing loan, according to an exemplary embodiment. In this embodiment, each value P in predetermined table 500 corresponds to a particular combination of an ACI for the loan determined in step 420 and the data or information regarding the OLTV ratio received in step 310. The column labeled "ACI RANGE" contains a plurality of ACI ranges A1-A13 and the columns labeled "OLTV RANGE" contain a plurality of OLTV ranges O1-O7. A value P corresponds to each combination of an ACI range and an OLTV range. For example, a value P(A1,O1) corresponds to a combination of ACI range A1 and OLTV range O1. To determine the corresponding value representative of the price for the loan, the ACI and OLTV ranges corresponding to the ACI for the loan determined in step 420 and the data or information regarding the OLTV ratio received in step 310 are identified. For example, a loan having an ACI of 630 and an OLTV ratio of 65 would have a corresponding value of P(A7,O2). Higher risk loans correspond to higher values, and lower risk loans correspond to lower values. For example, for a given ACI range, the corresponding value will increase with an increasing OLTV ratio. For a given OLTV range, the value will increase with a decreasing ACI.

The values in predetermined table 500 are determined for varying probabilities of delinquency (e.g. ACI scores), OLTV ratios, loan purposes, and loan terms based on economic risk factors. For example, according to an exemplary embodiment, the values in predetermined table 500 are determined based on economic risk factors that include estimates of future capital reserve requirements, future market conditions such as projected house prices and interest rates, projected rates of default on loans, projected rates of prepayment on loans, projected financial loss from a default, etc. According to an exemplary embodiment, predetermined table 500 is a predetermined table of values representative of guaranty fees based on projected economic factors, with each guaranty fee corresponding to a particular combination of the probability of delinquency for the loan determined in step 420 and the data or information regarding the loan-to-value ratio, loan purpose, and loan term received in step 310. According to yet other exemplary embodiments, other factors are used to determine the values in predetermined table 500 (e.g., mortgage insurance coverage, occupancy status, etc.)

Computing the values for predetermined table 500 involve, for example, running a number of computer simulations based on one or more mathematical economic models or other associated equations to generate a number of statistical data paths (i.e., economic scenarios) representative of a range of projected economic conditions for a given time period. The statistical data paths may then be used to estimate a statistical distribution of one or more variables associated with a group of loans, such as, for example, a group of mortgage loans associated with manufactured housing. These distributions may in turn be used to calculate further variables associated with the group of loans.

Figure 6:
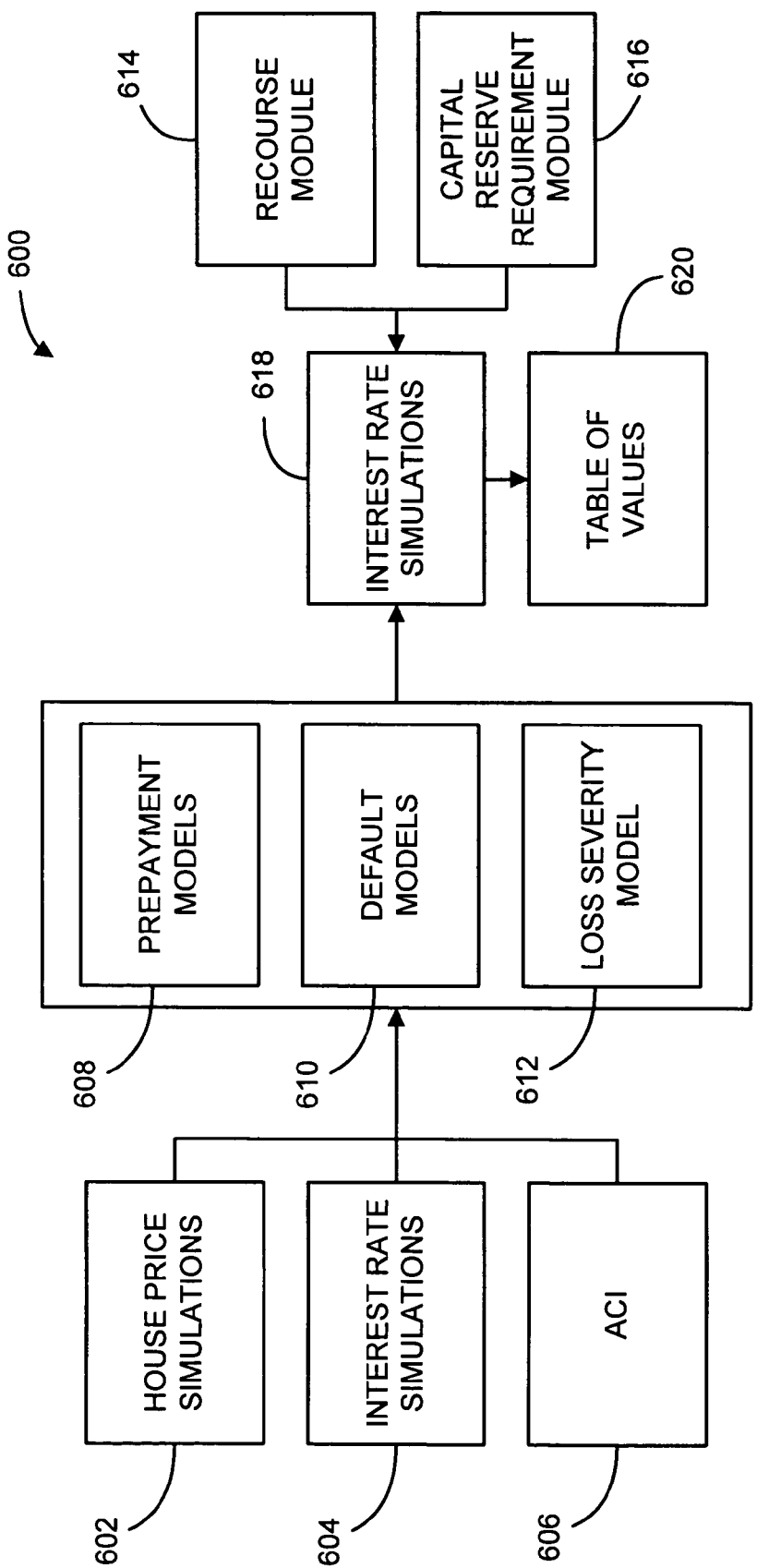
FIG. 6 diagrammatically illustrates a process for generating a predetermined table of values representative of prices for a loan according to an exemplary embodiment.

FIG. 6 diagrammatically illustrates a process 600 for generating a predetermined table of values representative of prices for a loan according to an exemplary embodiment. By way of example, a predetermined table of values representative of guaranty fees associated with a group of manufactured housing loans over a period may be generated using process 600 by first simulating a number (e.g., 1000) of statistical data paths representing a range of projected economic conditions over the period, such as house price simulations 602 and interest rate simulations 604, based on predetermined mathematical house price or interest rate prediction models. One or more variables associated with the group of loans may then be calculated for varying probabilities of delinquency (e.g. ACI scores 606), as well as OLTV ratios, loan purposes, and loan terms based on these simulations. For example, periodic and cumulative prepayment rates, default rates, and severity of default (e.g., financial loss) may be calculated for each of the statistical data paths based on corresponding predetermined mathematical models 608, 610, and 612, and these calculations may be used to obtain statistical distributions pertaining to, for example, periodic and cumulative losses and unpaid loan balances. Given these distributions, as well as input from a recourse module 614 and a capital reserve requirement module 616, cash flows 618 and guaranty fees 620 may then be computed for the period in order to generate the predetermined table of values representative of guaranty fees.

Referring again to FIG. 3, in a step 330, the underwriting recommendation is provided based on the value representative of the overall risk associated with the loan determined in step 320 (e.g. the value representative of the price for the loan determined using the method of FIG. 4). The underwriting recommendation provides an indication to the lender as to whether the loan is approved for purchase by a purchaser in the secondary market based on credit risk eligibility requirements. Because the value determined in step 320 is determined based on the risk associated with the loan, it can be used to categorize the loan with regard to the underwriting recommendation.

The value determined for the loan in step 320 is associated with a corresponding underwriting recommendation. For example, the value determined for the loan in step 320 may be associated with a corresponding underwriting recommendation based on a set of predetermined value ranges. Loans having an associated value within a particular predetermined value range or ranges receive an approval recommendation (e.g., they are approved for purchase by the secondary market purchaser), while loans having an associated value representative of a price within another particular predetermined range of prices do not receive an approval recommendation (e.g., they are not approved for purchase by the secondary market purchaser). According to various exemplary embodiments, the underwriting recommendation comprises multiple levels of recommendation defined by various value ranges, such that loans may be recommended by the secondary market purchaser according to varying levels. For example, the value ranges may correspond to exemplary recommendation levels including a "normal approval" level, one or more "expanded approval" levels, a "refer with caution" level, etc. The various levels of recommendation may be used, for example, to facilitate management of the risk associated with the loan or with an aggregate portfolio of loans (e.g., to drive verification requirements or other loan acquisition requirements, such as terms and conditions of the loan, the property, etc.).

FIG. 7 illustrates corresponding levels of recommendation for a predetermined table 700 of values representative of prices for a loan according to an exemplary embodiment. In the illustrated embodiment, each value P is associated with a corresponding level of recommendation as indicated by the shaded areas defining approval levels 702, 704, 706, 708, and 710, such that all values P within a particular shaded area are associated with the same level of recommendation. According to other exemplary embodiments, additional, fewer, or differing levels of recommendation may be implemented.

A recommendation level 702 corresponds to a "normal approval" recommendation level. By way of example, a loan, such as a mortgage loan associated with manufactured housing, having an associated value P(A9,O4) determined in step 320, will be provided with a "normal approval" recommendation. The "normal approval" recommendation level may indicate, for example, that the loan is recommended under normal financing terms and conditions based on the level of risk commonly associated with loans having similar associated characteristics.

A recommendation level 704 corresponds to an "expanded approval" recommendation level. By way of example, a loan, such as a mortgage loan associated with manufactured housing, having a value P(A5,O3) determined in step 320, will be provided with an "expanded approval" recommendation. Recommendation level 704 may indicate, for example, that while the mortgage loan does not qualify for "normal approval," it still receives an approval recommendation based on financing terms and conditions which may differ from those for "normal approval."

A recommendation level 706 corresponds to another "expanded approval" recommendation level. By way of example, a loan, such as a mortgage loan associated with manufactured housing, having a value P(A4,O3) determined in step 320, will be provided with an "expanded approval" recommendation. Recommendation level 706 may indicate, for example, that while the mortgage loan does not qualify for recommendation levels 702 or 704, it still received an approval recommendation based on financing terms and conditions which may differ from those for recommendation levels 702 or 704.

A recommendation level 708 corresponds to yet another "expanded approval" recommendation level. By way of example, a loan, such as a mortgage loan associated with manufactured housing, having a value P(A3,O3) determined in step 320, will be provided with an "expanded approval" recommendation level. Recommendation level 708 may indicate, for example, that while the mortgage loan does not qualify for recommendation levels 702, 704, or 706, it still receives an approval recommendation based on financing terms and conditions which may differ from those for approval levels 702, 704 or 706.

A recommendation level 710 corresponds to a "referral with caution" recommendation level. By way of example, a loan, such as a mortgage loan associated with manufactured housing, having a value P(A1,O3) determined in step 320, will be provided with a "referral with caution" level of recommendation. Recommendation level 710 may indicate, for example, that the mortgage loan does meet the requirements of the secondary market purchaser based on the increased risk commonly associated with loans having similar characteristics, and that the lender should use caution in making any decision to underwrite the loan.

Referring again to FIG. 3, according to another exemplary embodiment, the underwriting recommendation in step 330 is provided based on the value representative of overall risk associated with the loan determined in step 320, and further based on one or more loan product eligibility guidelines. The loan product eligibility guidelines define those loans that do not meet the requirements of the secondary market purchaser, regardless of the price determined in step 320. By way of example, loan product eligibility guidelines for manufactured housing mortgage loans may include, for example, restrictions limiting the OLTV to no greater than a predetermined value, restrictions requiring owner occupancy, restrictions requiring a single detached unit, restrictions requiring 15 or 20 year amortization periods, restrictions against cash-out refinance transactions, etc.

According to another exemplary embodiment, a second risk indication indicative of the risk of an adverse event associated with the loan, such as the risk of default, a financial loss as the result of default, the risk of prepayment, or the risk of delinquency may be provided in addition to the first risk indication. The second risk indication is a pure indication of the risk of the adverse event, and is not based on the value representative of overall risk associated with the loan determined in step 320. By way of example, a guaranty fee determined in step 320 may be lower for a mortgage loan having a loan-to-value (LTV) ratio of 75 than for a mortgage loan having a loan-to-value ratio of 85, thus indicating that the mortgage loan having a loan-to-value ratio of 75 presents a lower risk to a secondary mortgage market purchaser based on a probability of delinquency for the loan and various economic risk factors. However, if the mortgage loan having the loan-to-value ratio of 85 has mortgage insurance, and the mortgage loan having the loan-to-value ratio of 75 does not, the guaranty fee determined in step 320 may not accurately reflect the increased risk of default for the mortgage loan having the loan-to-value ratio of 75. Accordingly, the underwriting recommendation in step 330 may be provided for each loan based on the guaranty fee determined in step 320 (i.e., indicating the overall risk to the secondary mortgage market purchaser, which is lower for the 75 LTV loan), and may be accompanied by a second risk indication that is a pure indication of the risk of default associated with each loan (which may be lower for the 85 LTV loan). According to other exemplary embodiments, factors other than LTV and mortgage insurance are used to determine the second risk indication.

The second risk indication may be in the form of a message indicating the risk. The message may indicate, for example, that the loan is associated with one of several predetermined risk levels. According to various exemplary embodiments, the second risk indication comprises multiple levels of risk defined by various ranges, such that loans may be evaluated according to varying levels of risk. The various levels of risk may be used, for example, to facilitate management of the risk associated with the loan or with an aggregate portfolio of loans. The second risk indication may be provided in the form of a report based on the second risk indication and optionally the value representative of overall risk associated with the loan in order to facilitate management of the risk associated with the loan or with an aggregate portfolio of loans.

The second risk indication may be used by, for example, a lender or other mortgage originator, a mortgage insurer, or a loan servicer so that risk management decisions may be made independent of the overall risks and costs of the loan to, for example, a secondary market purchaser, that are reflected in the value (e.g., a price or guaranty fee) determined in step 320 and the underwriting recommendation in step 330. For example, a lender may use the second risk indication independently of or in addition to an underwriting recommendation to determine whether to hold or sell a loan, whether to require mortgage insurance, how to determine a mortgage insurance premium from data, such as a rate schedule, developed and provided by a mortgage insurer, etc.

A mortgage insurer may use the second risk indication to determine, for example, whether to provide mortgage insurance, to determine costs and amounts of mortgage insurance, etc. For example, the mortgage insurer may receive the second risk indication for a mortgage loan from a computerized loan underwriting system (or may optionally receive both an underwriting recommendation and the second risk indication), and in response may provide the computerized loan underwriting system with pricing information (e.g., costs and amounts of mortgage insurance) for the mortgage loan. The mortgage insurer may also use information related to a plurality of predetermined risk levels (e.g., provided by a secondary mortgage market purchaser associated with a computerized loan underwriting system) to develop data, such as a schedule of mortgage insurance rates, prices, or amounts, to be correlated with each predetermined risk level for use by, for example, a lender, to determine a mortgage insurance premium for the mortgage loan.

A loan servicer may use the second risk indication to evaluate and manage the risk associated with servicing a mortgage loan. For example, a loan servicer may receive the second risk indication for a mortgage loan from a computerized system and may use the second risk indication to adjust the amount of servicing maintenance for a borrower associated with the mortgage loan. The loan servicer may, for example, increase the number of payment reminders communicated to a borrower for a mortgage loan having a second risk indication indicating a higher risk. The loan servicer may also use the second risk indication to manage its own risk associated with its book of business. For example, the loan servicer may adjust various types or amounts of investments in its investment portfolio to hedge against a risk of an adverse event associated with a particular mortgage loan or group of mortgage loans handled by the loan servicer.

The secondary mortgage market participant may also use the second indication of the risk of an adverse event associated with the loan. For example, the secondary mortgage market purchaser may use the second risk indication to determine a borrower's eligibility for new types of loan products (e.g., special reduced income or asset documentation programs, reduced mortgage insurance programs, etc.).

Figure 8:
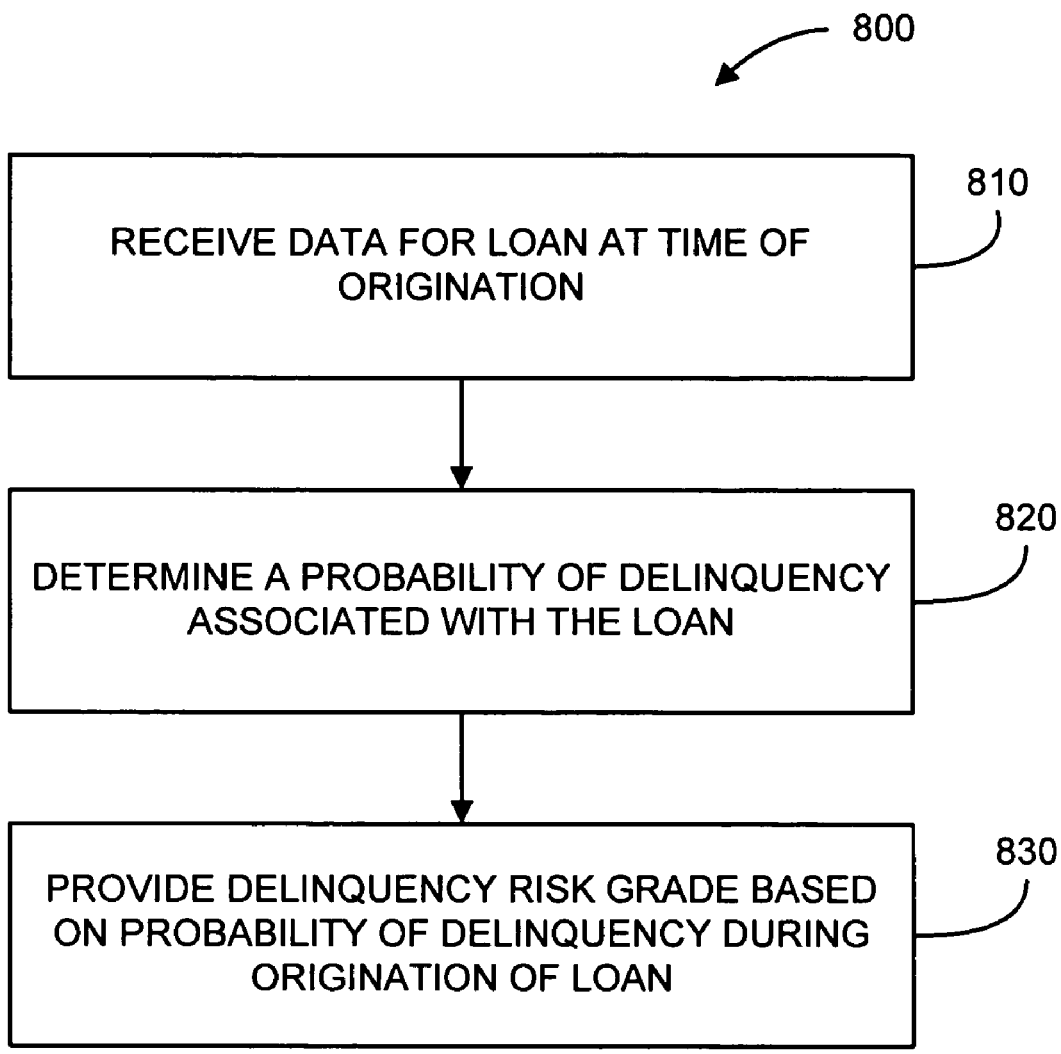
FIG. 8 is a flow diagram illustrating a method of determining a second risk indication indicative of the risk of delinquency associated with a loan according to an exemplary embodiment.

FIG. 8 illustrates a method 800 of determining a second risk indication indicative of the risk associated with a loan at the time of origination of the loan, wherein the second risk indication is a delinquency risk grade associated with a mortgage loan, according to an exemplary embodiment. In this embodiment, the delinquency risk grade is determined during loan origination using data received for the loan in a step 810, including those types of borrower-specific information, loan-specific information, and property-specific information and other information supplied by a borrower or lender as described above with reference to FIG. 2. A probability of delinquency (e.g., an ACI) is then determined in a step 820 using the received data. For example, the received data may be used to determine a credit rating as described above with reference to step 410 shown in FIG. 4. A probability of delinquency (e.g., an ACI) may then be determined as described above with reference to step 420 as shown in FIG. 4. According to various other embodiments, other additional or different factors or steps may be used to determine the probability of delinquency for the loan. In a step 830, the delinquency risk grade is provided based on the probability of delinquency. The delinquency risk grade is a pure indication of the risk of delinquency, and is not based on the value representative of overall risk associated with the loan. According to various exemplary embodiments, the delinquency risk grade comprises multiple delinquency risk levels defined by various ranges, such that loans may be evaluated according to varying levels of delinquency risk. The various delinquency risk levels may be used, for example, to facilitate management of the risk associated with the loan or with an aggregate portfolio of loans (e.g., to drive verification requirements or other financing requirements, such as terms and conditions of the loan, the property, etc.).

Figure 9:
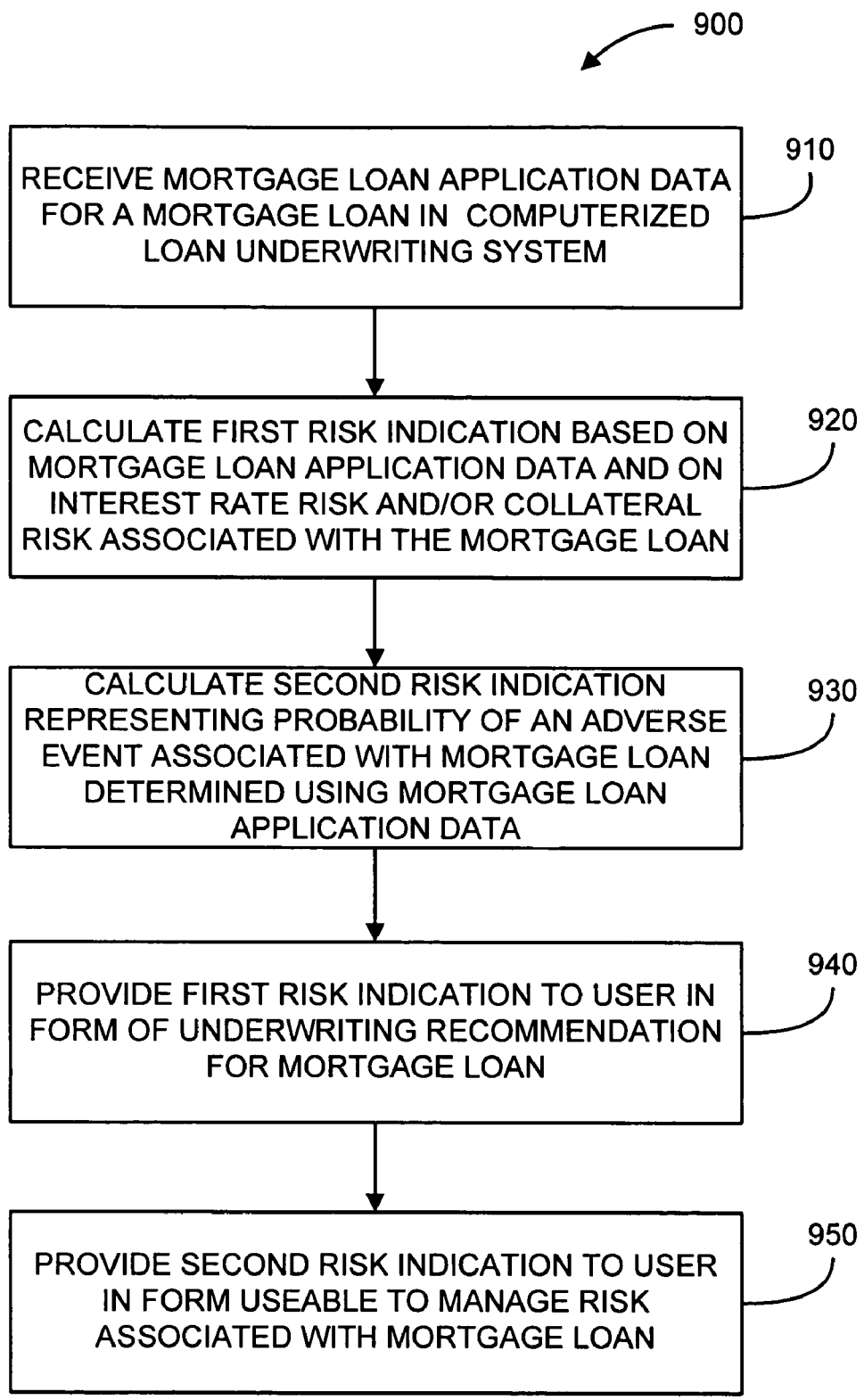
FIG. 9 is a flow diagram illustrating an exemplary method of providing an evaluation of risk associated with a mortgage loan using a first risk indication and a second risk indication.

FIG. 9 illustrates an exemplary method of providing an evaluation of risk associated with a mortgage loan using a first risk indication and a second risk indication. The method begins with a step 910. In step 910 mortgage loan application data for a mortgage loan is received in a computerized loan underwriting system, such as system 100. The loan application data may be provided by, for example a lender or other user of the computerized loan underwriting system. In a step 920, a first risk indication is calculated for the mortgage loan. The first risk indication is based on the received mortgage loan application and further based on at least one of interest rate risk and collateral risk associated with the mortgage loan. The first risk indication may be calculated using, for example, method 300 (shown in FIG. 3). In a step 930, a second risk indication is calculated for the loan. The second risk indication represents a probability of an adverse event associated with the mortgage loan. The probability of the adverse event is determined using the mortgage loan application data. The second risk indication may be calculated using, for example, method 800 (shown in FIG. 8).

In a step 940, the first risk indication is provided to a user (e.g., a lender, mortgage insurer, loan servicer, etc.) in the form of an underwriting recommendation for the mortgage loan. In a step 950, the second risk indication is provided to the user in a form which is useable by the user to manage the risk associated with the mortgage loan.

The method of and system for evaluating a loan may generally be implemented as part of a computerized system. For example, engines and systems of system 100 may utilize existing computer capabilities, both hardware and software, and electronic communication links, for example, to receive and process (e.g., in real time) loan data provided by a broker, a lender, etc. Originator system 110 and loan data processing system 120 and engines and subsystems thereof may be implemented on computer systems or devices and may include computer servers. An exemplary computer system or device may include a general purpose computing device including a processing unit, a system memory, and a system bus that couples various system components including the system memory to the processing unit. The system memory may include read only memory (ROM) and random access memory (RAM). The computer may also include a magnetic hard disk drive for reading from and writing to a removable magnetic disk, and an optical disk drive for reading from or writing to a removable optical disk such as a CD-ROM or other optical media. The drives and their associated computer-readable media provide nonvolatile storage of computer-executable instructions, data structures, program modules, and other data for the computer. Systems 110 and 120 may be implemented on a separate logical server or using separate physical devices.

Exemplary computer systems or servers in system 100 may operate under the control of computer software to carry out the process steps described herein. Computer software for each system or engine may include a set of software objects and/or program elements including computer-executable instructions collectively having the ability to execute independently in a separate thread or logical chain of process evaluation, while permitting the flow of data inputs therebetween. Computer-executable instructions comprise, for example, instructions and data which cause a general or special purpose computer system or processing device to perform a certain function or group of functions.

Data may be communicated between the various systems and engines of system 100 in real time over the Internet or other computer network environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. It will be appreciated that such network computing environments will typically encompass many types of computer system configurations, including personal computers, hand-held devices, multi-processor systems, microprocessor-based or programmable consumer electronics, network PCs, mini-computers, mainframe computers, and the like. System 100 may also be implemented in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It will be further be appreciated that system 100 may perform fewer or additional functions as compared to those described herein. For example, an entity (e.g., a lending institution) that performs only some of the above-mentioned processes may use a computer system that contains only a subset of the functions described herein. Additionally, one or more of the systems or functions of system 100 may be variously combined in alternative configurations.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A system for evaluating risk associated with a mortgage loan, comprising:

at least one computer, the computer including computer-implemented logic;
   a computer database coupled to the computer;
   wherein the computer implemented logic further comprises:
   an automated underwriting engine configured to calculate a first risk indication and a second risk indication for the mortgage loan, wherein the first risk indication is based on mortgage loan application data received for the mortgage loan and further based on at least one of interest rate risk and collateral risk associated with the mortgage loan, the first risk indication configured to reflect economic risk associated with the mortgage loan for a secondary mortgage market investor, the first risk indication providing one of a plurality of approval recommendation levels, wherein the second risk indication represents a probability of delinquency associated with the mortgage loan and comprises one of a plurality of delinquency risk levels, and wherein the probability of the adverse event is determined based on the mortgage loan application data, the second risk indication is configured to represent only the probability of the adverse event and not the economic risk associated with the mortgage loan for the secondary mortgage market investor; and
   user interface logic configure to provide a user interface, and further configured to provide the first risk indication to a lender in the form of an underwriting recommendation for the mortgage loan, and to provide the second risk indication to the lender in a form which is useable by the lender to manage the risk associated with the mortgage loan.

2. The system of claim 1, wherein the first risk indication and the second risk indication are provided simultaneously as part of underwriting findings transmitted to the lender during origination of the mortgage loan.

3. The system of claim 1, wherein the automated underwriting logic is further configured to determine acquisition terms for the mortgage loan based on the approval recommendation level.

4. The system of claim 1, wherein the underwriting recommendation is for a potential acquisition of the mortgage loan by a secondary mortgage market investor.

5. The system of claim 1, wherein the automated underwriting engine is further configured to determine eligibility for a loan product based on the delinquency risk level.

* * * * *